United States Patent
Rogers et al.

(10) Patent No.: US 10,149,466 B2
(45) Date of Patent: Dec. 11, 2018

(54) FISHING LINE SPOOLER

(71) Applicants: Aaron Levi Rogers, Wesley, AR (US); Dennis Rogers, Huntsville, AR (US)

(72) Inventors: Aaron Levi Rogers, Wesley, AR (US); Dennis Rogers, Huntsville, AR (US)

( * ) Notice: Subject to any disclaimer, the term of this patent is extended or adjusted under 35 U.S.C. 154(b) by 0 days.

(21) Appl. No.: 15/796,281

(22) Filed: Oct. 27, 2017

(65) Prior Publication Data

US 2018/0116193 A1   May 3, 2018

Related U.S. Application Data

(60) Provisional application No. 62/413,548, filed on Oct. 27, 2016.

(51) Int. Cl.
  *A01K 89/016* (2006.01)
  *A01K 89/017* (2006.01)

(52) U.S. Cl.
  CPC .......... *A01K 89/017* (2013.01); *A01K 89/016* (2013.01)

(58) Field of Classification Search
  CPC .... A01K 89/00; A01K 89/003; A01K 89/016; A01K 89/017; A01K 89/045; A01K 89/058; B65H 54/106; B65H 54/72; B65H 54/12; B65H 54/44; B65H 54/547; B65H 59/04; B65H 2701/355
  See application file for complete search history.

(56) References Cited

U.S. PATENT DOCUMENTS

| | | | | |
|---|---|---|---|---|
| 3,704,840 A | * | 12/1972 | Haddock | A01K 89/003 242/470 |
| 4,007,886 A | * | 2/1977 | Kaminstein | A01K 89/003 242/470 |
| 4,310,126 A | * | 1/1982 | Norleen | A01K 89/003 242/157.1 |
| 4,588,139 A | * | 5/1986 | Lines | A01K 89/003 242/470 |
| 5,551,645 A | * | 9/1996 | Torvund | A01K 89/003 242/395 |
| 5,709,350 A | * | 1/1998 | Davis | A01K 89/003 242/390.8 |
| 5,725,172 A | * | 3/1998 | Koehler | A01K 89/00 242/395 |
| 5,906,329 A | * | 5/1999 | Wesley, Sr. | A01K 89/003 242/390.8 |

(Continued)

FOREIGN PATENT DOCUMENTS

JP   3198395 U * 7/2015

*Primary Examiner* — William A. Rivera

(57) ABSTRACT

A fishing line spooler is an apparatus that both spools and strips a fishing line. The apparatus is portable and mountable. The apparatus accommodates a variety of spinning reels and fishing line spools. The apparatus includes a base plate, a stand, a line-guiding plate, a motor, a main shaft, and a spool retainer. The base plate positions and upholds the stand. The stand offsets the motor and the main shaft from the base plate. The line-guiding plate directs the fishing line from a spool and prevents the fishing line from twisting. The motor rotates a spinning reel mount and a line stripper spool, individually, in order to spool and strip a fishing line, respectively. The main shaft mounts a fishing line spool. The spool retainer secures the position of the fishing line spool along the main shaft while allowing the fishing line spool to rotate about the main shaft.

16 Claims, 13 Drawing Sheets

(56) References Cited

U.S. PATENT DOCUMENTS

| | | | | |
|---|---|---|---|---|
| 6,260,785 B1* | 7/2001 | Prais | ................... | A01K 89/003 242/390.8 |
| 6,533,210 B1* | 3/2003 | Berke | ................. | A01K 89/003 242/390.8 |
| 2017/0064933 A1* | 3/2017 | Tseng | .................. | A01K 89/003 |

* cited by examiner

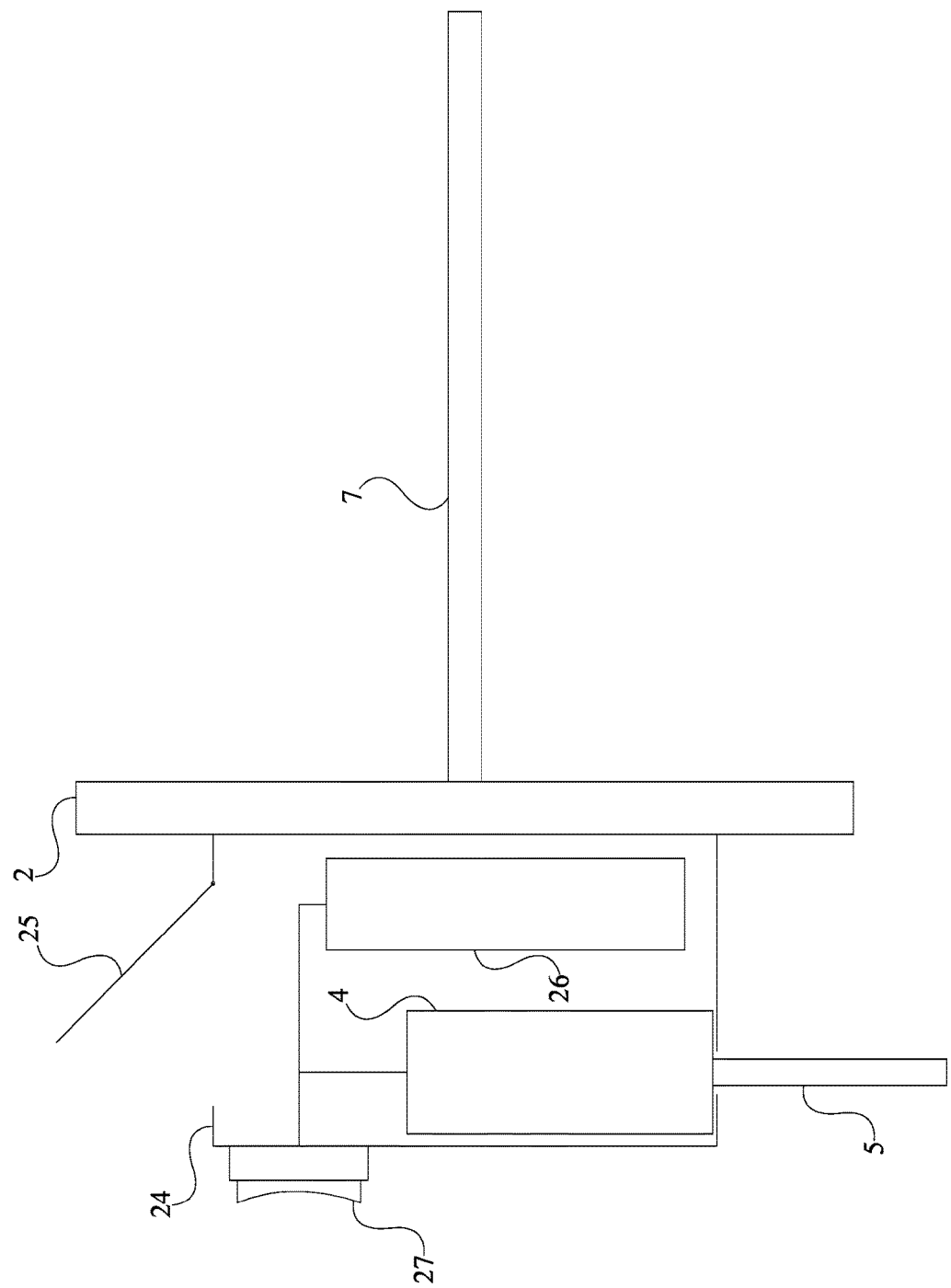

US 10,149,466 B2

FISHING LINE SPOOLER

The current application claims a priority to the U.S. Provisional Patent application Ser. No. 62/413,548 filed on Oct. 27, 2016.

FIELD OF THE INVENTION

The present invention relates generally to fishing line spoolers. More specifically, the present invention is a fishing line spooler that is portable. The present invention both spools a fishing line onto a spinning reel and strips a fishing line from a fishing rod. Furthermore, the present invention accommodates a variety of spinning reels.

BACKGROUND OF THE INVENTION

Stripping fishing line from a fishing spinning reel is cumbersome task that is necessary after fishing. There are several devices in the market which can perform said task, though these devices tend to very bulky and are not portable. These devices may also not be automatic in which they require the user to actuate a crank or handle to begin the spooling process. Spooling a fishing reel from a fishing line is also difficult task to complete without the aid of spooling station.

It is therefore an objective of the present invention to provide a fishing line spooling apparatus which compact and portable. Fishing line of a fishing spinning reel may be freely and easily stripped to a spool of the present invention through the rotation of a motor. Fishing line of various sized spools may be spooled onto a fishing spinning reel through the present invention. Fishing line is automatically run through from a fishing line spool to the fishing spinning reel. The present invention reduces line twist when the fishing spinning reel is spooled.

BRIEF DESCRIPTION OF THE DRAWINGS

FIG. 13 is a schematic view of the electrical connections between the motor, the power source, and the power switch.

DETAILED DESCRIPTION OF THE INVENTION

Figure 1:
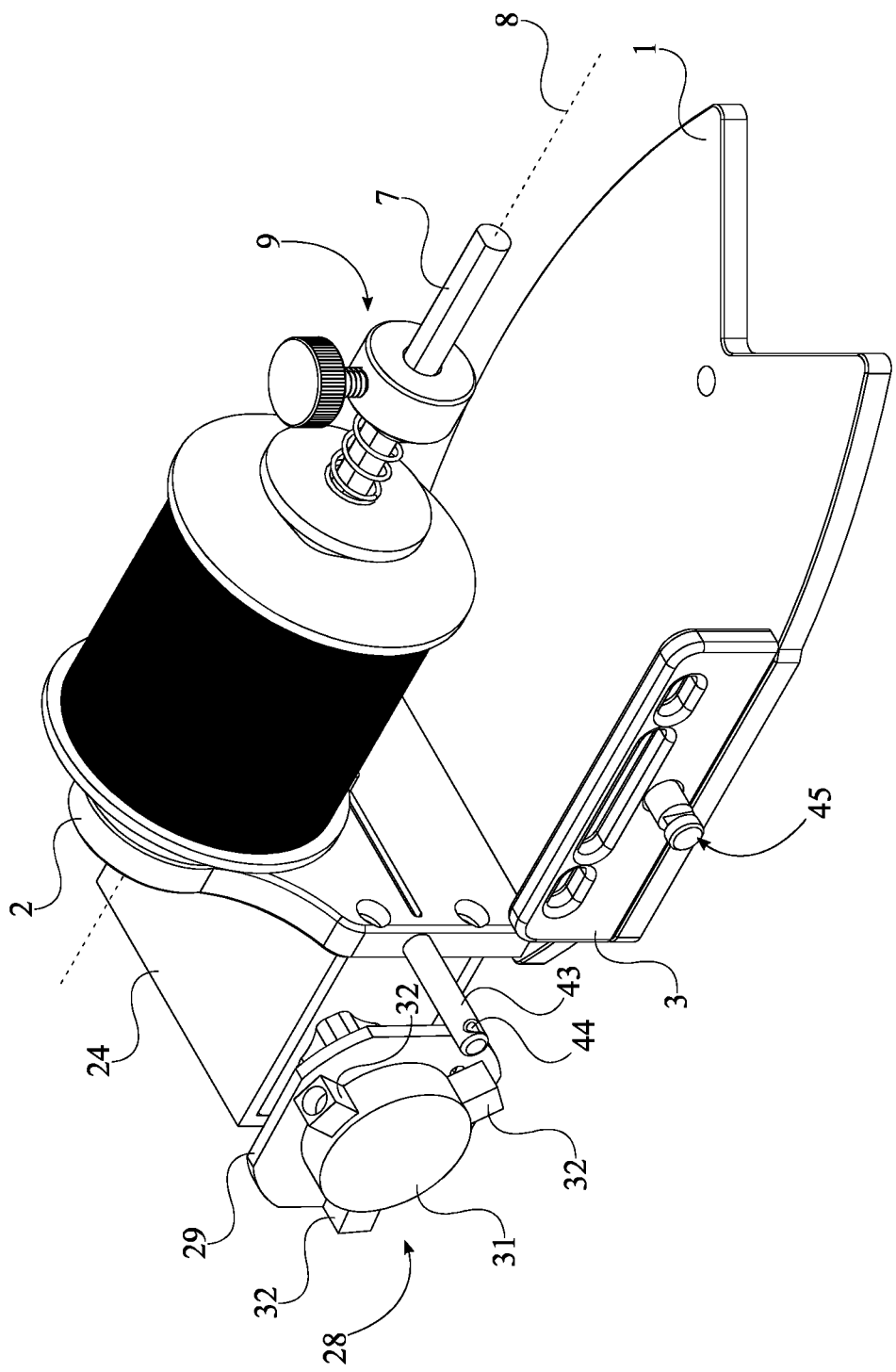
FIG. 1 is a perspective view of the preferred embodiment of the present invention with a spinning reel mount attached to the output axle of the motor and a fishing reel spool secured onto the main shaft with the spool retainer.

All illustrations of the drawings are for the purpose of describing selected versions of the present invention and are not intended to limit the scope of the present invention.

The present invention is a fishing line spooler that automatically spools a fishing line onto spinning reels of various sizes. The present invention also strips a fishing line from a fishing rod. The present invention is portable and mountable onto any surface, therefore allowing a user to both spool and strip a fishing line while fishing on a boat. The present invention prevents the twisting of the line and eliminates any manual input by the user as the fishing line is spooled or stripped. In order for the present invention to both spool and strip a fishing line, the present invention comprises a base plate 1, a stand 2, a line-guiding plate 3, a motor 4, a main shaft 7, and a spool retainer 9, shown in FIG. 1, FIG. 4, FIG. 5, and FIG. 10. The base plate 1 upholds the stand 2 and the line-guiding plate 3. The present invention is mountable onto a variety of surface with the base plate 1. The base plate 1 may be fastened onto a surface with a clamp, a plurality of screws, a plurality of bolts, and so on. The stand 2 upholds the motor 4 and the main shaft 7 such that a variety of adapters that may be attached to the motor 4 and various sized spools that are attached to the main shaft 7 do not come into contact with the base plate 1. The line-guiding plate 3 defines a path for which a fishing line travels from a spool to a spinning reel. The line-guiding plate 3 therefore prevents the twisting of the fishing line as the fishing line is spooled onto a spinning reel. The motor 4 rotates various attachments and adapters that spools and strips a fishing line so that no manual input is required from the user. The main shaft 7 upholds both a variety of spools and the spool retainer 9 as the fishing line is being spooled onto a spinning reel. The main shaft 7 allows for the continuous rotation of a spool as the fishing line is being spooled onto a spinning reel. The spool retainer 9 secures a spool onto the main shaft 7, such that the spool does not slide across the main shaft 7.

Figure 2:
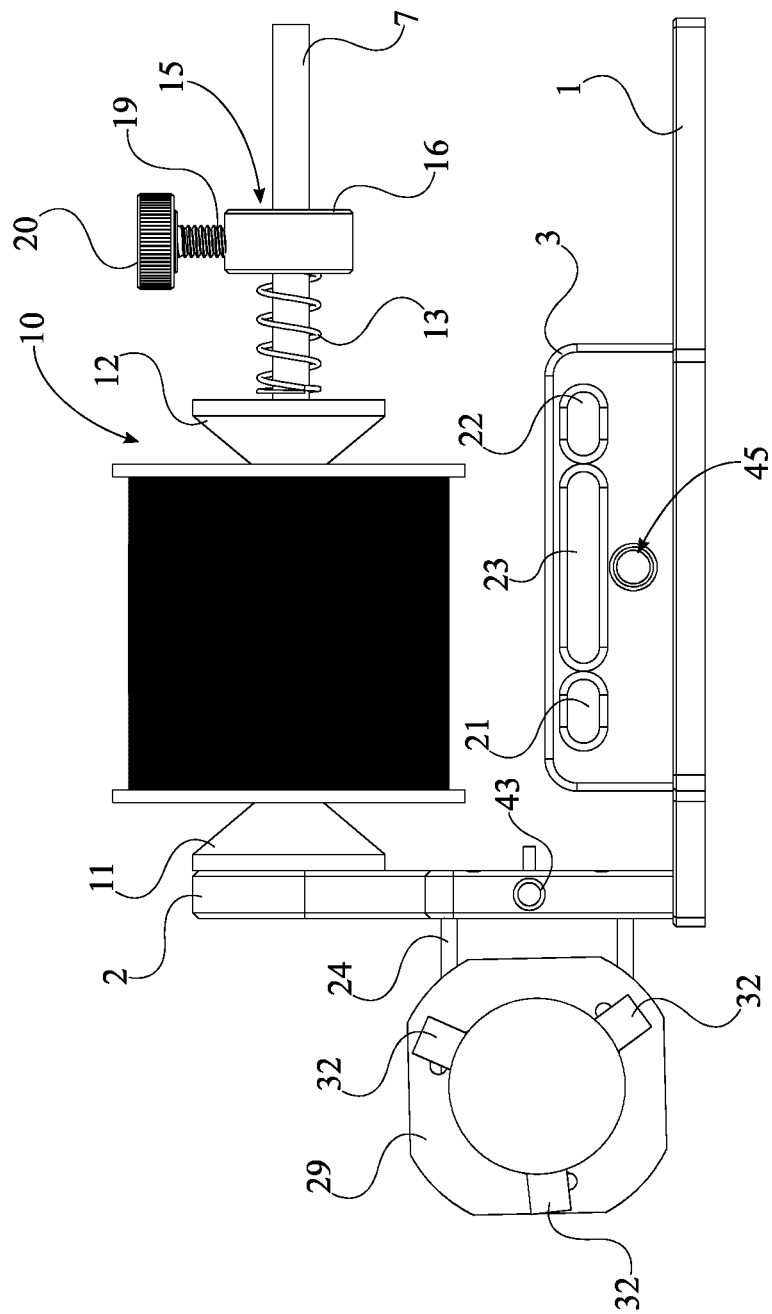
FIG. 2 is a front side view of the preferred embodiment of the present invention with a spinning reel mount attached to the output axle of the motor and a fishing reel spool secured onto the main shaft with the spool retainer.

The overall configuration of the aforementioned components allows the present invention to serve as a universal tool for fishing line spools and spinning reels. The main shaft 7 is mounted parallel and offset from the base plate 1 by the stand 2, thereby providing structural balance, as illustrated in FIG. 2. The line-guiding plate 3 is mounted to the base plate 1, adjacent the stand 2, and is positioned perpendicular to the base plate 1. This configuration effectively directs the fishing line from a spool to a spinning reel without twisting. The motor 4 is laterally connected to the stand 2, offset from the base plate 1, in order for a variety of attachments to rotate freely. An output axle 5 of the motor 4 is oriented towards the line-guiding plate 3, simplifying the path of the fishing line from the spool to a spinning reel. In the preferred embodiment of the present invention, the main shaft 7 is mounted on the stand 2, opposite the motor 4, in order to offset the portion of the fishing line unraveling from the spool from the portion of fishing line being spooled. A central axis 8 of the main shaft 7 is oriented perpendicular to a rotation axis 6 of the output axle 5 of the motor 4, further eliminating any twisting of the fishing line. As the spool rotates about the main shaft 7, the spool slides back and forth along the main shaft 7, increasing the twist of the fishing line as it is spooled onto the spinning reel. In order to prevent the sliding of the spool, the spool retainer 9 is integrated onto the main shaft 7.

In order for the line-guiding plate 3 to effectively guide the fishing line from a spool to a spinning reel, the present invention comprises a first side hole 21, a second side hole 22, and a central elongated hole 23, each of which accommodates various sized spools. Seen in FIG. 1, FIG. 2, and FIG. 4, the first side hole 21, the central elongated hole 23, and the second side hole 22 each traverse through the line-guiding plate 3. The first side hole 21 is positioned adjacent the central elongated hole 23. The second side hole 22 is positioned adjacent the central elongated hole 23, opposite the first side hole 21. The first side hole 21, the second side hole 22, and the central elongated hole 23 are oriented parallel to each other. This configuration allows the first side hole 21 to accommodate the fishing line of a spool of a shorter length and the second side hole 22 to accommodate the fishing line of a spool of a larger length. The central elongated hole 23 accommodates the fishing line of a spool of a length between the first side hole 21 and the second side hole 22.

The present invention further comprises a motor housing 25. The motor housing 25 conceals and protects the motor 4. Furthermore, the motor housing 25 upholds and connects the motor 4 against the stand 2, as seen in FIG. 1, FIG. 4, FIG. 5, and FIG. 10. More specifically, the motor housing 25 is laterally mounted to the stand 2, opposite the main shaft 7. The motor 4 is mounted within the motor housing 25 in order to protect the motor 4 from the elements of the surrounding environment. The output axle 5 of the motor 4 traverses through the motor housing 25 in order to accommodate adapters and attachments. An alternate embodiment of the present invention further comprises a door 25. The door 25 allows a user to access the motor 4 without having to remove or detach the motor housing 25 from the stand 2. The door 25 is integrated into the motor housing 25 and may comprise a fastener so that the door 25 may remain closed unless otherwise opened by the user.

Moreover, the present invention comprises a power source 26 and a power switch 27 in order for a user to engage the motor 4, shown in FIG. 13. The power source 26 provides the necessary power to the motor 4, and the power switch 27 turns on and turns off the motor 4 by connecting and interrupting the electrical connection between the power source 26 and the motor 4, respectively. The power switch 27 is integrated into the motor housing 25 so that a user may access the power switch 27. The power source 26 is electrically connected to the motor 4 and the power switch 27, thereby being able to both provide the power to the motor 4 as well as be controlled by the power switch 27. The power source 26 is preferably mounted within the motor housing 25 so that the present invention is not connected to an external power source 26. The power source 26 is preferably a battery. However, it is understood that in alternate embodiments, the power source 26 may be mounted external to the motor housing 25.

In order to spool a fishing line onto a spinning reel, the present invention comprises a spinning reel mount 28, shown in FIG. 1, FIG. 5, FIG. 6, FIG. 7, and FIG. 8. The spinning reel mount 28 connects a spinning reel to the motor 4, thereby allowing the spinning reel to rotate freely. The spinning reel mount 28 comprises a cam plate 29, a knob 30, a hub 31, and a plurality of arms 32. The cam plate 29 defines the path of the plurality of arms 32. The knob 30 rotates the hub 31 and consequently extends and retracts the plurality of arms 32. The hub 31 houses the plurality of arms 32. The plurality of arms 32 presses against an interior surface of a spinning reel, thereby gripping onto the spinning reel regardless of the size of the spinning reel. In order for the spinning reel mount 28 to serve as a universal adapter between a spinning reel and the motor 4, the knob 30 is torsionally connected to the output axle 5 of the motor 4, and the hub 31 is torsionally connected to the knob 30. The cam plate 29 is rotatably connected to the torsional connection between the knob 30 and the hub 31 so that plurality of arms 32 uniformly extends and retracts from and into the hub 31, respectively. The plurality of arms 32 is radially and slidably mounted into the hub 31 in order to accommodate various sized spinning reels. Moreover, the cam plate 29 is operatively engaged to each of the plurality of arms 32, wherein the cam plate 29 is used to extend the plurality of arms 32 from the hub 31 and is used to retract the plurality of arms 32 into the hub 31.

Figure 6:
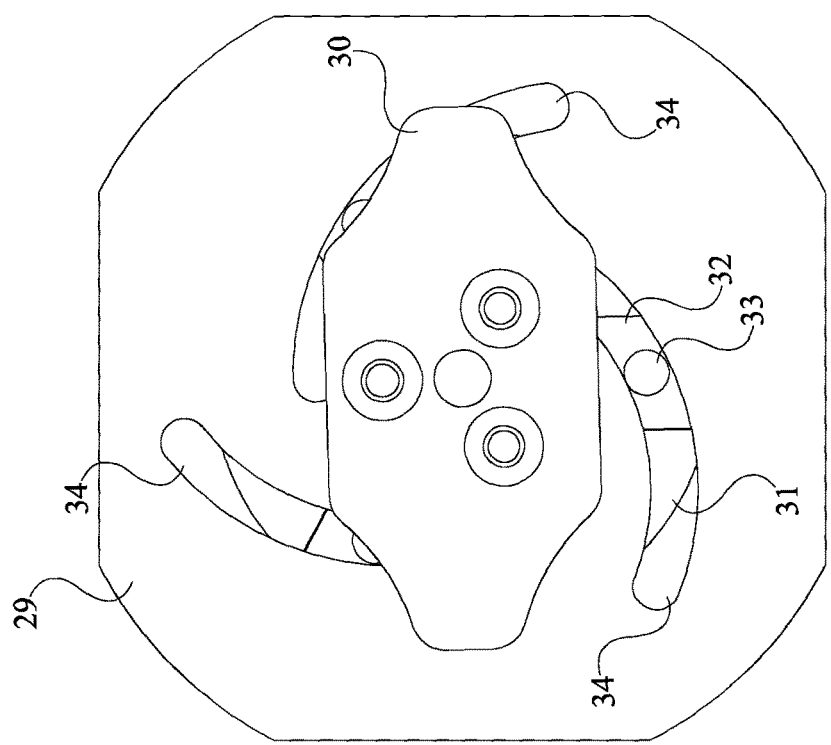
FIG. 6 is a rear side view of the spinning reel mount of the present invention.
Figure 7:
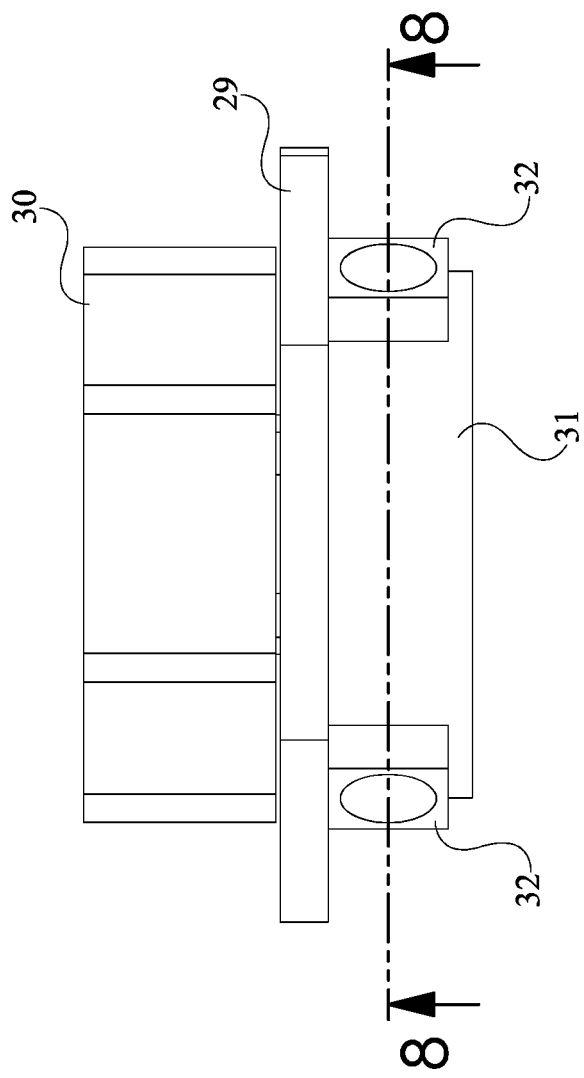
FIG. 7 is a top side view of the spinning reel mount of the present invention.
Figure 8:
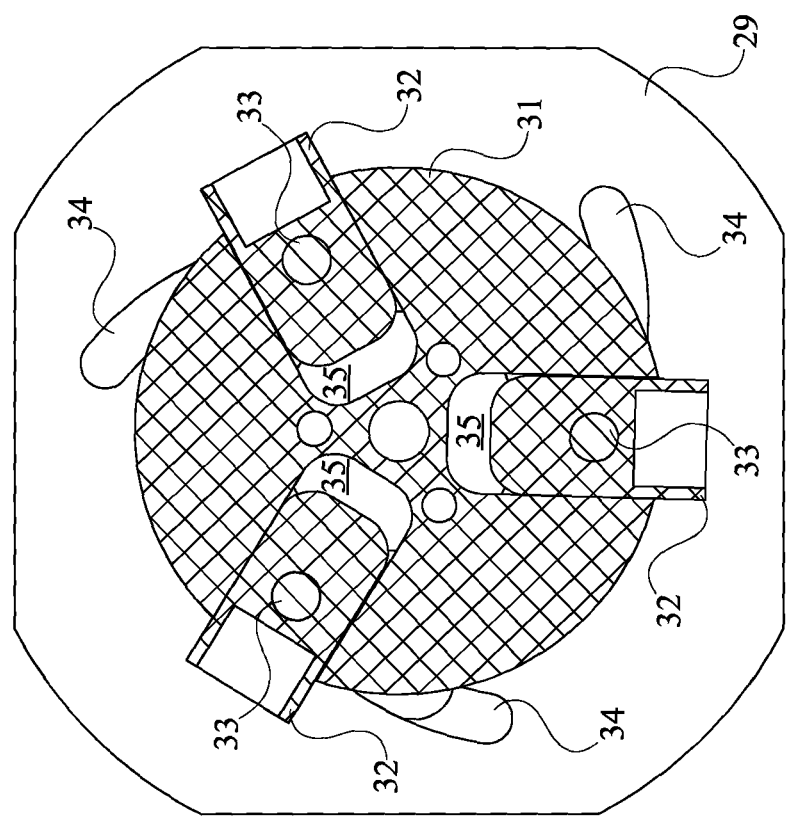
FIG. 8 is a cross-sectional view of the spinning reel mount of the present invention along line 8-8 of FIG. 7.

In the preferred embodiment of the present invention, the spinning reel further comprises a plurality of dowels 33 and a plurality of curved tracks 35, shown in FIG. 6, FIG. 7, and FIG. 8. The plurality of dowels 33 connects the plurality of arms 32 to the cam plate 29. The plurality of curved tracks 35 defines the path of the plurality of dowels 33, and consequently the plurality of arms 32, across the cam plate 29. The plurality of curved tracks 35 is integrated into the cam plate 29 and is radially distributed about the cam plate 29. This arrangement converts the radial movement of the hub 31 to linear movement of the plurality of dowels 33 into and out of the hub 31. Each of the plurality of dowels 33 is connected perpendicularly to a corresponding arm from the plurality of arms 32 in order to accommodate the arrangement between the cam plate 29 and the hub 31. More specifically, each of the plurality of dowels 33 are slidably engaged along a corresponding track from the plurality of curved tracks 35.

Figure 9:
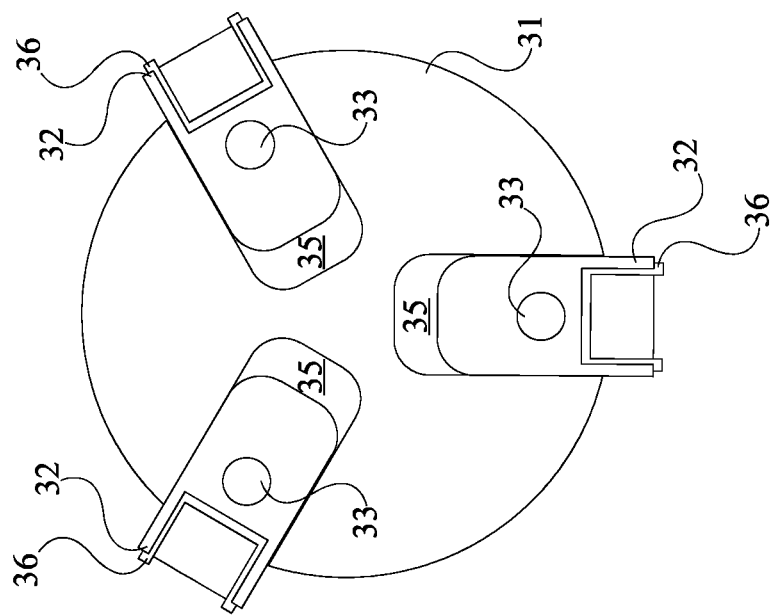
FIG. 9 is a schematic view of the plurality of arms and the plurality of grips present invention.

The spinning reel mount 28 further comprises a plurality of slots 35, seen in FIG. 8 and FIG. 9, which effectively secures each of the plurality of arms 32 within the hub 31. The plurality of slots 35 laterally traverses into the hub 31 so that the plurality of arms 32 may traverse across the cam plate 29. More specifically, the plurality of arms 32 is radially distributed about the hub 31. Each of the plurality of arms 32 are slidably engaged into a corresponding slot from the plurality of slots 35, thereby expanding or retracting in order to accommodate spinning reels of various sizes. An alternate embodiment of the present invention comprises a plurality of grips 36, seen in FIG. 9. The plurality of grips 36 increases the friction between each of the plurality of arms 32 and a corresponding spinning reel. In the preferred embodiment of the present invention a slot laterally traverses into each of the plurality of arms 32, allowing a grip of the plurality of grips 36 to be mounted onto a corresponding arm of the plurality of arms 32. More specifically, each of the plurality of grips 36 are terminally connected to a corresponding arm from the plurality of arms 32, opposite the hub 31, as the ends of each of the plurality of arms 32 opposite the hub 31 press directly against an engaged spinning reel.

Figure 4:
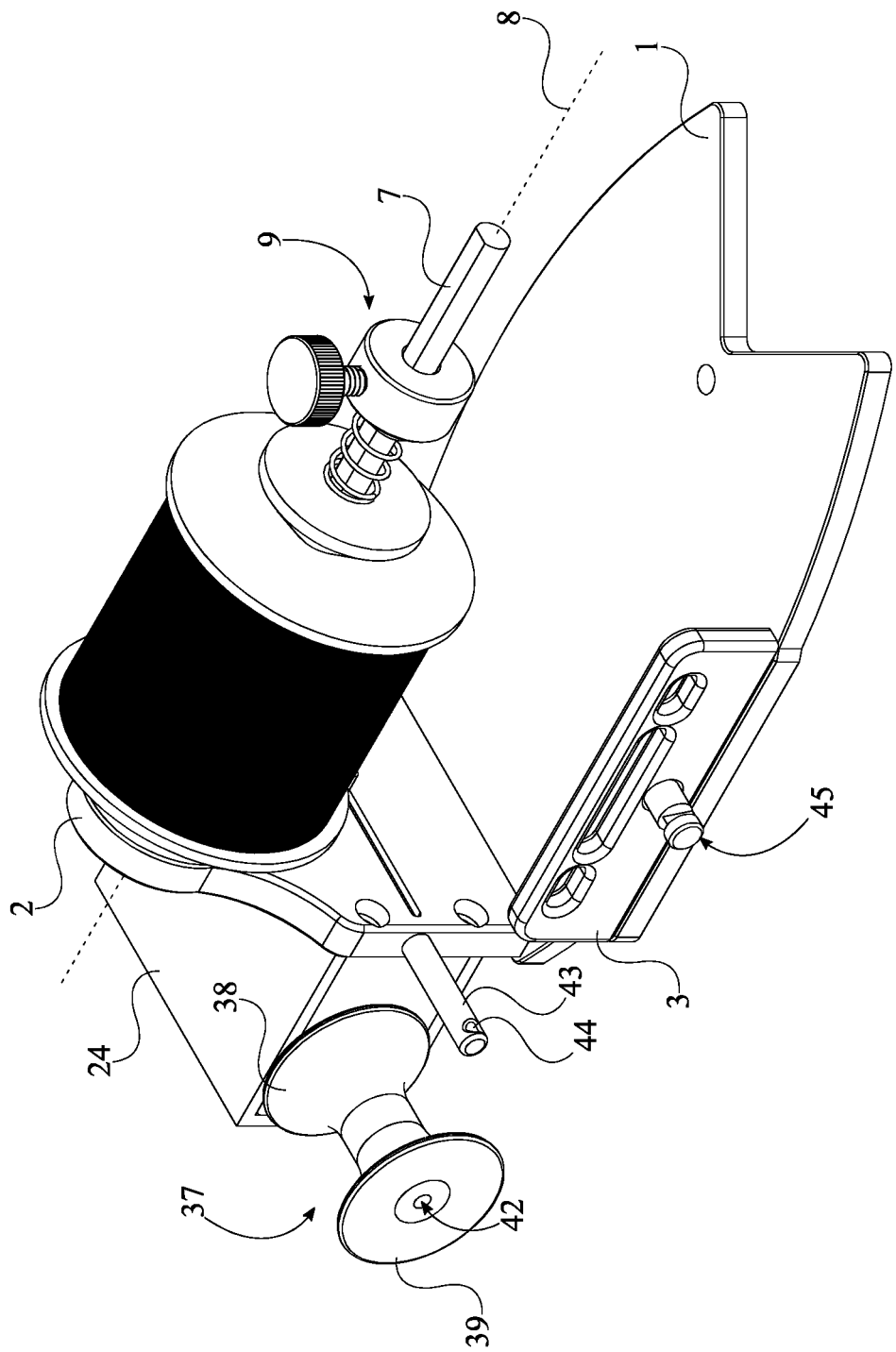
FIG. 4 is a perspective view of the preferred embodiment of the present invention with a line stripper spool attached to the output axle of the motor and a fishing reel spool secured onto the main shaft with the spool retainer.
Figure 5:
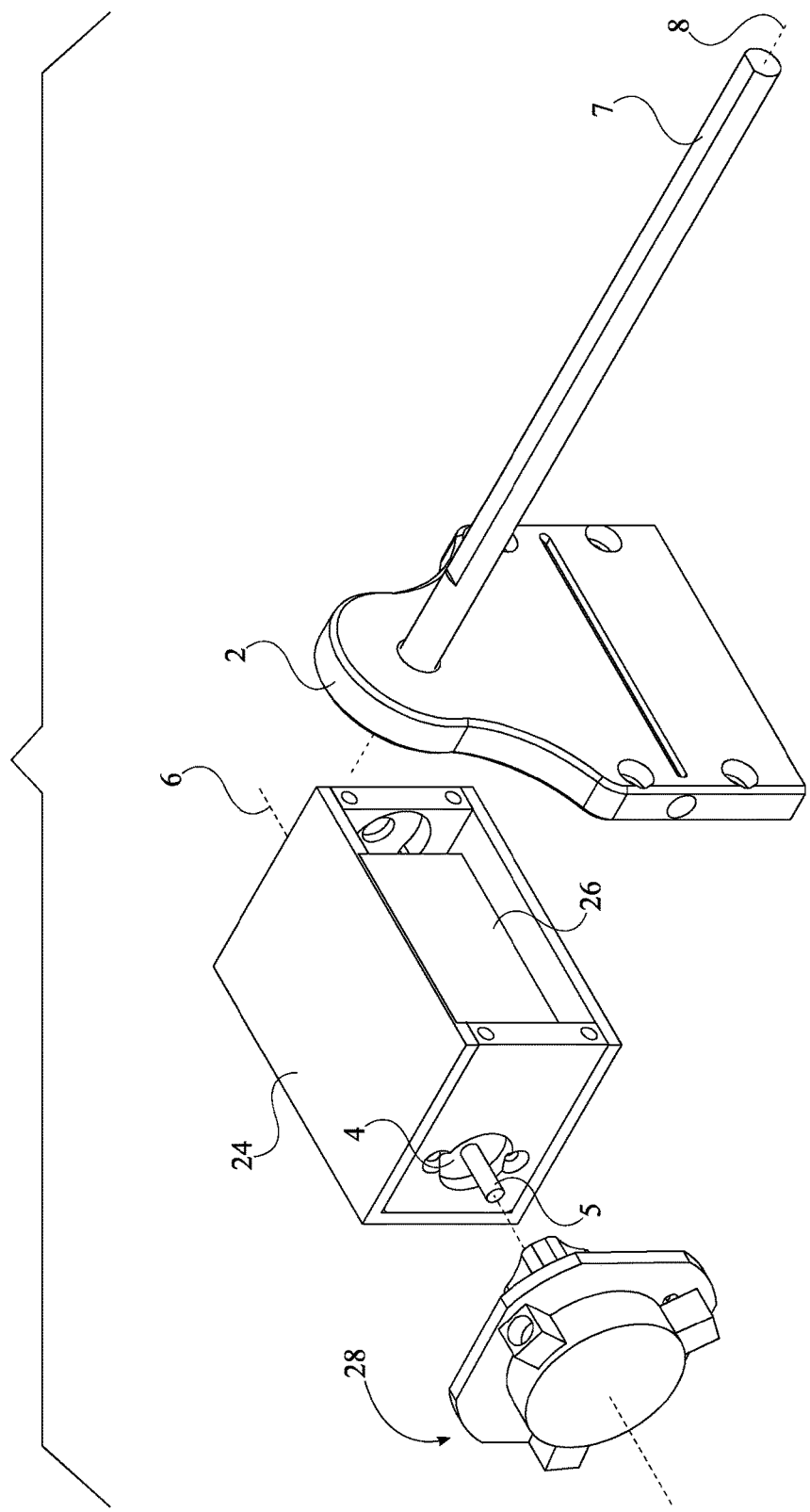
FIG. 5 is an exploded view of the spinning reel mount, the motor, the stand, and the main shaft of the present invention with the motor and the power source contained within the motor housing.
Figure 10:
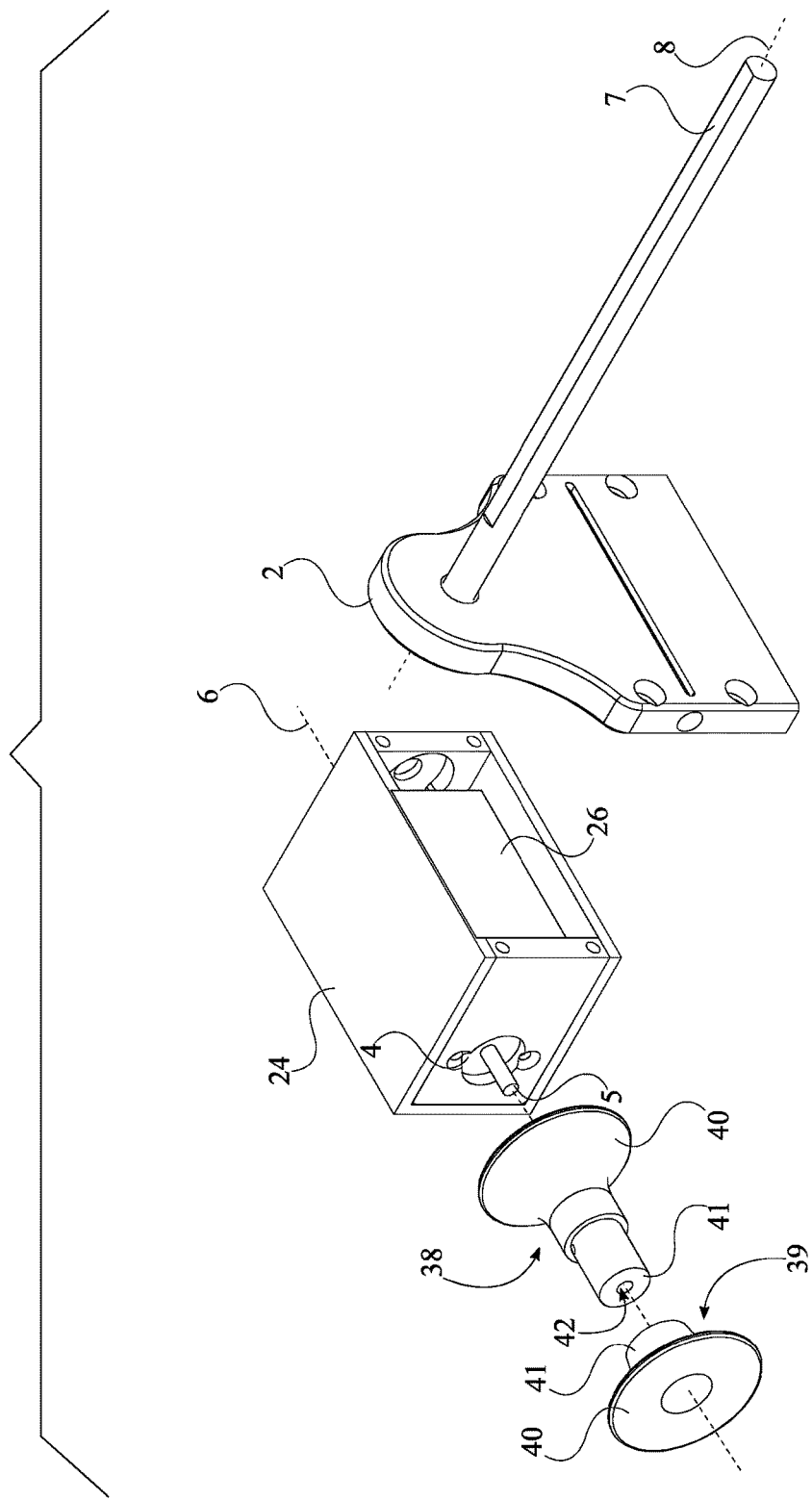
FIG. 10 is an exploded view of the line stripper spool, the motor, the stand, and the main shaft of the present invention with the motor and the power source contained within the motor housing.

In order to strip a fishing line from a fishing rod, the present invention further comprises a line stripper spool 37, seen in FIG. 4 and FIG. 10. The line stripper spool 37 collects the fishing line from a fishing rod in an organized fashion. If the spinning reel mount 28 is attached to the output shaft 5 of the motor 4 and the user wishes to strip a fishing line from a fishing rod, the user simply removes the spinning reel mount 28 and attaches the line stripper spool 37, and vice versa. Moreover, the fishing line is bundled without any twisting. The line stripper spool 37 comprises a mounting portion 38 and a capping portion 39. The mounting portion 38 connects the line stripper spool 37 to the motor 4, and the capping portion 39 contains the stripped fishing line. The mounting portion 38 is mounted onto the output axle 5 of the motor 4 so that the line stripper spool 37 automatically rotates without any input from the user. The capping portion 39 is detachably attached to the mounting portion 38 so that the user may retrieve the bundled fishing line without having to undo or unwind the spooled fishing line about the line stripper spool 37. The capping portion 39 is positioned adjacent to the mounting portion 38, opposite the motor 4, thereby preventing the fishing line from slipping past the line stripper spool 37.

In the preferred embodiment of the present invention, a line slot 42, shown in FIG. 4 and FIG. 10, allows a fishing line to be secured between the connection of the mounting portion 38 and the capping portion 39. The fishing line may then wrap around the line stripper spool 37 and be automatically stripped from a fishing rod. The line slot 42 traverses through the capping portion 39. In order to prevent the fishing line from escaping past the line stripper spool 37, the mounting portion 38 and the capping portion 39 preferably each comprises a base end 40 and a tapered end 41. The base end 40 is positioned opposite the tapered end 41. The base end 40 is larger in size in order to contain the fishing line about the tapered end 41 as the line stripper spool 37 rotates. More specifically, the base end 40 of the mounting portion 38 is positioned adjacent to the motor 4. The tapered end 41 of the capping portion 39 is pressed against the tapered end 41 of the mounting portion 38, defining a continuous, curved surface for which the fishing line may wrap around. The line slot 42 traverses through the capping portion 39 from the tapered end 41 to the base end 40 of the capping portion 39. This arrangement allows a user to secure the fishing line between the tapered end 41 of the capping portion 39 and the tapered end 41 of the mounting portion 38, then slip the fishing line around the line stripper spool 37. The tapered end 41 of the mounting portion 38 comprises a protrusion that slips into a slot of the tapered end 41 of the capping portion 39, as seen in FIG. 10. The user turns on the motor 4 with the power switch 27 and the fishing line automatically wraps around the line stripper spool 37, thereby being stripped from a corresponding fishing rod.

The present invention further prevents the twisting of a fishing line that is being spooled onto a spinning reel as the present invention comprises a line guide rod 43 and a line channel 44, seen in FIG. 1, FIG. 2, and FIG. 4. The line guide rod 43 positions the line channel 45 along the path of the fishing line from a spool mounted onto the main shaft 7 to the spinning reel that is mounted onto the output axle 5 of the motor 4. The line channel 45 guides the fishing line from the spool to the spinning reel, more specifically, the portion of the path between the line-guiding plate 3 and the spinning reel mount 28. In order to position the line channel 45 along that portion of the path, the line guide rod 43 is laterally mounted to the stand 2 and is positioned in between the output axle 5 of the motor 4 and the line-guiding plate 3. The line channel 45 traverses through the line guide rod 43 and is oriented perpendicular to the rotation axis 6 of the output axle 5 of the motor 4. This arrangement ensures a linear path of the fishing line towards the spinning reel just before the fishing line wraps around the spinning reel, eliminating any twisting of the fishing line.

Figure 11:
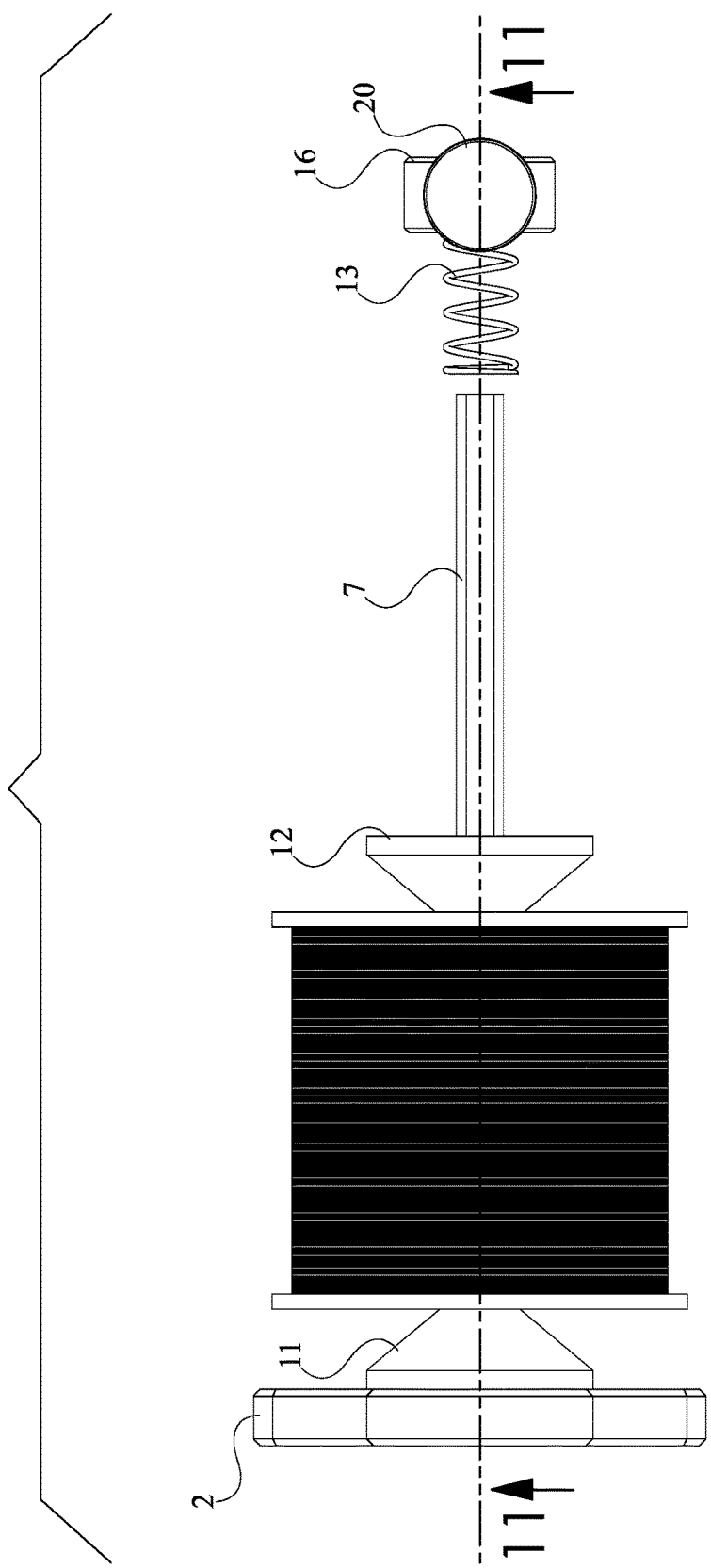
FIG. 11 is an exploded top side view of the spool retainer, the main shaft, a fishing line spool, and the stand of the present invention, wherein the slideable lock and the spring are removed from the main shaft.
Figure 12:
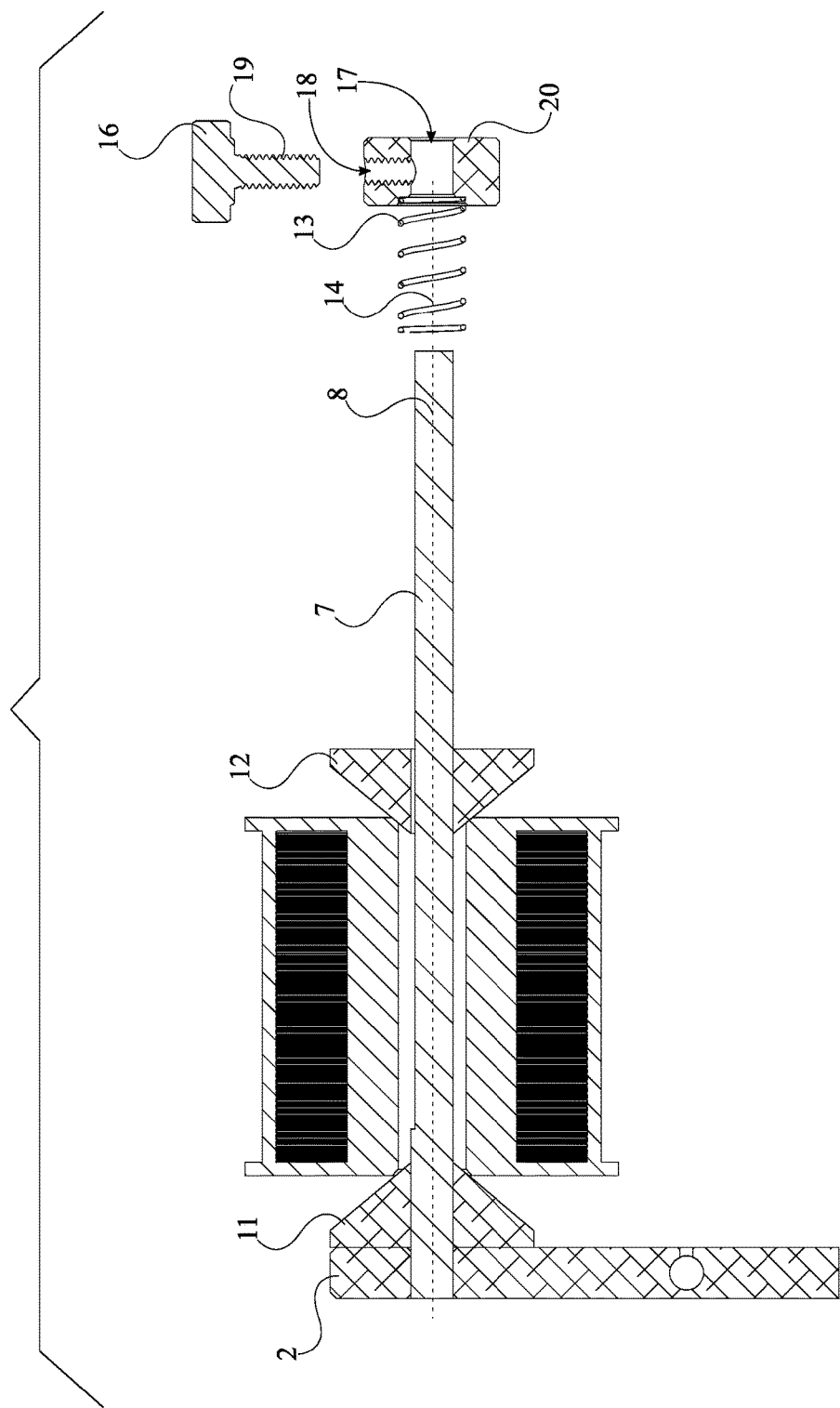
FIG. 12 is a cross-sectional view of FIG. 11 along line 12-12.

A fishing line spool is securely mounted onto the main shaft 7 as the spool retainer 9 comprises a clamp 10, a spring 13, and a slideable lock 15, illustrated in FIG. 2, FIG. 11, and FIG. 12. The clamp 10 surrounds the spool. The spring 13 allows the slideable lock 15 to more effectively press against the clamp 10 and limit any damage to the fishing line spool. The slideable lock 15 allows a user to adjust the clamp 10 according to the length of the fishing line spool. In order for the clamp 10 to surround the fishing line spool, the clamp 10 comprises a stationary stopper 11 and a slideable stopper 12. The stationary stopper 11 offsets the fishing line spool from the stand 2. This allows the fishing line spool to freely rotate as the fishing line is pulled from the fishing line spool by the spinning reel attached to the spinning reel mount 28 without encountering 16 any friction from the stand 2. The slideable stopper 12 allows the clamp 10 to secure fishing line spools of various sizes onto the main shaft 7. The stationary stopper 11 and the slideable stopper 12 both preferably comprise a tapered end and a base end. The tapered end being positioned opposite the tapered end. The base end of the stationary stopper 11 being pressed against the stand 2. The tapered end of the slideable stopper 12 being positioned adjacent the tapered end of the stationary stopper 11. The tapered ends of both the stationary stopper 11 and the slideable stopper 12 facilitates the free rotation of the fishing line spool about the main shaft 7 and between the clamp 10.

The configuration of the aforementioned components of the spool retainer 9 allows the fishing line spool to freely rotate about the main shaft 7 without moving linearly across the main shaft 7. As shown in FIG. 11 and FIG. 12, the stationary stopper 11 is pressed against the stand 2, and the slideable stopper 12 is slidably engaged with the main shaft 7. The user may remove the slideable stopper 12, and consequently the slideable lock 15, from the main shaft 7 in order to insert a fishing line spool on the main shaft 7. The slideable stopper 12 is positioned adjacent the slideable stopper 12, positioned opposite the stand 2, in order for the slideable stopper 12 for the clamp 10 to surround the fishing line spool. The slideable lock 15 is terminally fixed to the spring 13, and the spring 13 is positioned adjacent to the slideable stopper 12, opposite the stationary stopper 11. This allows the clamp 10 to grasp onto the fishing line spool as tight as possible. A central axis 15 of the spring 13 is aligned with the central axis 8 of the main shaft 7 so that the force of the spring 13 is centralized on the slideable stopper 12 and the grip of the clamp 10 is stabilized around the fishing line spool. The slideable lock 15 is also slidably engaged with the main shaft 7 in order for a user to insert a fishing line spool between the stationary stopper 11 and the slideable stopper 12.

In the preferred embodiment of the present invention, the slideable lock 15 comprises a ring 16, a male-threaded shaft 19, and a knob 20. The ring 16 attaches the slideable lock 15 onto the main shaft 7. As seen in FIG. 12, the ring 16 further comprises a channel 17, which accommodate the main shaft 7, and a female-threaded hole 18, which accommodates male-threaded shaft. The male-threaded shaft 19 secures the position of the ring 16 along the main shaft 7. The knob 20 allows the user to engage and disengage the male-threaded shaft 19 with the main shaft 7. The channel 17 is oriented perpendicular to the female-threaded hole 18, and the main shaft 7 traverses through the channel 17. Consequently, the male-threaded shaft 19 is oriented perpendicular to the main shaft 7 and securely presses against the main shaft 7. The male-threaded shaft 19 is engaged with the female-threaded hole 18. The knob 20 is terminally fixed to the male-threaded shaft 19, opposite to the female-threaded hole 18. This arrangement utilizes the rotary force applied by the user with knob 20 to apply a normal force against the main shaft 7, thereby securing 16 the position of the ring 16 along the main shaft 7.

Figure 3:
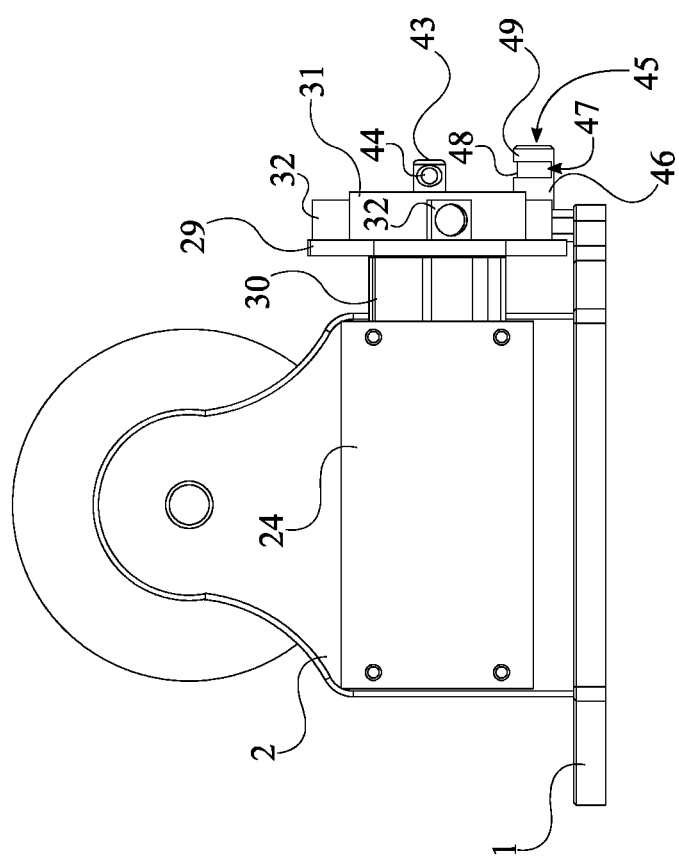
FIG. 3 is a left side view of the preferred embodiment of the present invention with a spinning reel mount attached to the output axle of the motor and a fishing reel spool secured onto the main shaft with the spool retainer.

Once enough of the fishing line from the spool has been spooled onto the spinning reel, the fishing line may be cut. As the present invention is meant to be a portable tool, the present invention further comprises a line cutter 45 that allows a user to cut a fishing line. In order to cut a fishing line, the line cutter 45 comprises a mounting body 46, a blade 47, and cap 49, illustrated in FIG. 3. The mounting body 46 attaches the blade 47 to the line-guiding plate 3. The blade 47 cuts the fishing line, and the cap 49 prevents the blade 47 from being exposed and coming into contact with another surface or the user. The mounting body 46 is fixed onto the line-guiding plate 3, and the blade 47 is fixed to the mounting body 46, opposite the line-guiding plate 3. This allows the user to easily cut the fishing line along the path from the fishing line spool to the spinning reel. The cap 49 is attached to the blade 47, opposite the mounting body 46, and a sharpened edge 48 of the blade 47 is oriented away from the elongated base plate 1, effectively surrounding the blade 47 while allowing the user to cut the fishing line.

Although the invention has been explained in relation to its preferred embodiment, it is to be understood that many other possible modifications and variations can be made without departing from the spirit and scope of the invention as hereinafter claimed.

What is claimed is:

1. A fishing line spooler comprises:
a base plate;
a stand;
a line-guiding plate;
a motor;
a main shaft;
a spool retainer;
the main shaft being mounted parallel and offset from the base plate by the stand;
the line-guiding plate being mounted to the base plate, adjacent the stand;
the line-guiding plate being positioned perpendicular to the base plate;
the motor being laterally connected to the stand, offset from the base plate;
an output axle of the motor being oriented towards the line-guiding plate;
the main shaft being mounted on the stand, opposite the motor;
a central axis of the main shaft being oriented perpendicular to a rotation axis of the output axle of the motor;
the spool retainer being integrated onto the main shaft:,
a first side hole;
a second side hole;
a central elongated hole;
the first side hole traversing through the line-guiding plate;
the central elongated hole traversing through the line-guiding plate;
the second side hole traversing through the line-guiding plate;
the first side hole being positioned adjacent the central elongated hole;
the second side hole being positioned adjacent the central elongated hole, opposite the first side hole; and
the first side hole, the second side hole, and the central elongated hole being oriented parallel to each other.

2. The fishing line spooler as claimed in claim 1 comprises:
a motor housing;
the motor housing being laterally mounted to the stand, opposite the main shaft;
the motor being mounted within the motor housing; and,
the output axle of the motor traversing through the motor housing.

3. The fishing line spooler as claimed in claim 2 comprises:
a door; and,
the door being integrated into the motor housing.

4. The fishing line spooler as claimed in claim 1 comprises:
a power source;
a power switch;
a motor housing;
the motor housing being laterally mounted to the stand, positioned opposite the main shaft;
the motor being mounted within the motor housing;
the power switch being integrated into the motor housing; and, the power source being electrically connected to the motor and the power switch.

5. The fishing line spooler as claimed in claim 4 comprises:
the power source being mounted within motor housing.

6. The fishing line spooler as claimed in claim 1 comprises:
a spinning reel mount;
the spinning reel mount comprises a cam plate, a knob, a hub, and a plurality of arms;
the knob being torsionally connected to the output axle of the motor;
the hub being torsionally connected to the knob;
the cam plate being rotatably connected to the torsional connection between the knob and the hub;
the plurality of arms being radially and slidably mounted into the hub; and,
the cam plate being operatively engaged to each of the plurality of arms, wherein the cam plate is used to extend the plurality of arms from the hub and is used to retract the plurality of arms into the hub.

7. The fishing line spooler as claimed in claim 6 comprises:
the spinning reel mount further comprises a plurality of dowels and a plurality of curved tracks;
the plurality of curved tracks being integrated into the cam plate;
the plurality of curved tracks being radially distributed about the cam plate;
each of the plurality of dowels being connected perpendicularly to a corresponding arm from the plurality of arms; and,
each of the plurality of dowels being slidably engaged along a corresponding track from the plurality of curved tracks.

8. The fishing line spooler as claimed in claim 6 comprises:
the spinning reel mount further comprises a plurality of slots;
the plurality of slots laterally traversing into the hub;

the plurality of arms being radially distributed about the hub; and, each of the plurality of arms being slidably engaged into a corresponding slot from the plurality of slots.

9. The fishing line spooler as claimed in claim 6 comprises:

a plurality of grips; and, each of plurality of grips being terminally connected to a corresponding arm from the plurality of arms, opposite the hub.

10. The fishing line spooler as claimed in claim 1 comprises:

a line stripper spool;

the line stripper spool comprises a mounting portion and a capping portion;

the mounting portion being mounted onto the output axle of the motor;

the capping portion being detachably attached to the mounting portion; and, the capping portion being positioned adjacent to the mounting portion, opposite the motor.

11. The fishing line spooler as claimed in claim 10 comprises:

a line slot; and, the line slot traversing through the capping portion.

12. The fishing line spooler as claimed in claim 10 comprises:

a line slot;

the mounting portion and the capping portion each comprises a base end and a tapered end;

the base end being positioned opposite the tapered end;

the base end of the mounting portion being positioned adjacent the motor;

the tapered end of the capping portion being pressed against the tapered end of the mounting portion; and, the line slot traversing through the capping portion from the tapered end to the base end of the capping portion.

13. The fishing line spooler as claimed in claim 1 comprises:

a line guide rod;

a line channel;

the line guide rod being laterally mounted to the stand;

the line guide rod being positioned between the output axle of the motor and the line-guiding plate;

the line guide channel traversing through the line guide rod; and, the line guide channel being oriented perpendicular to the rotation axis of the output axle of the motor.

14. The fishing line spooler as claimed in claim 1 comprises:

the spool retainer comprises a clamp, a spring, and a slideable lock;

the clamp comprises a stationary stopper and a slideable stopper;

the stationary stopper being pressed against the stand;

the slideable stopper being slidably engaged with the main shaft;

the slideable stopper being positioned adjacent the stationary stopper, positioned opposite the stand;

the slideable lock being terminally fixed to the spring;

the spring being positioned adjacent to the slideable stopper, opposite the stationary stopper;

a central axis of the spring being aligned with the central axis of the main shaft; and, the slideable lock being slidably engaged with the main shaft.

15. The fishing line spooler as claimed in claim 14 comprises:

the slideable lock comprises a ring, a male-threaded shaft, and a knob;

the ring comprises a channel and a female-threaded hole;

the channel being oriented perpendicular to the female-threaded hole;

the main shaft traversing through the channel;

the male-threaded shaft being engaged with the female-threaded hole; and, the knob being terminally fixed to the male-threaded shaft, opposite the female-threaded hole.

16. The fishing line spooler as claimed in claim 1 comprises:

a line cutter;

the line cutter comprises a mounting body, a blade, and a cap;

the mounting body being fixed onto the line-guiding plate;

the blade being fixed to the mounting body, opposite the line-guiding plate;

the cap being attached to the blade, opposite the mounting body; and, a sharpened edge of the blade being oriented away from the elongated base plate.

* * * * *